United States Patent [19]
Duff et al.

[11] Patent Number: 4,765,098
[45] Date of Patent: Aug. 23, 1988

[54] RAIL CUTTING APPARATUS

[75] Inventors: Paul Duff, Racine; Michael E. Beach, East Troy, both of Wis.

[73] Assignee: Racine Railroad Products, Inc., Racine, Wis.

[21] Appl. No.: 2,497

[22] Filed: Jan. 12, 1987

[51] Int. Cl.⁴ .......................... B24B 7/00; B23D 19/00
[52] U.S. Cl. ...................................... 51/99; 51/166 R; 51/178; 51/241 LG; 83/490; 83/574
[58] Field of Search ................... 51/99, 178, 241 LG, 51/241 S, 241 R, 166 R, 985, 166 FB, 166 B, 166, 35, 93, 179, 108 R, 237 T, 166 MH, 166 T; 83/490, 486, 574; 144/103; 30/372, 388

[56] References Cited
U.S. PATENT DOCUMENTS

| | | |
|---|---|---|
| 2,950,493 | 8/1960 | Rosolia et al. ................... 51/108 R |
| 3,974,596 | 8/1976 | Huboud-Peron . |
| 4,033,074 | 7/1977 | Lutts . |
| 4,068,415 | 1/1978 | McIlrath . |
| 4,156,991 | 6/1979 | McIlrath . |

OTHER PUBLICATIONS

Instruction & Maintenance Manual of Safetran Systems Corp. in existence in 1979.
A Literature Sheet of Safetran Systems Corp. of an unknown date.

Primary Examiner—Frederick R. Schmidt
Assistant Examiner—Maurina Rachuba
Attorney, Agent, or Firm—Wood, Dalton, Phillips, Mason & Rowe

[57] ABSTRACT

A rail cutting apparatus mountable on a rail and having a linkage structure which supports a rail saw in an upright position at either side of a rail. The linkage structure and rail saw have coacting structure including a mounting block and a mounting plate which securely lock the rail saw in either of its positions and which enable movement of the rail saw between these two positions without complete removal of the rail saw from the linkage structure.

10 Claims, 3 Drawing Sheets

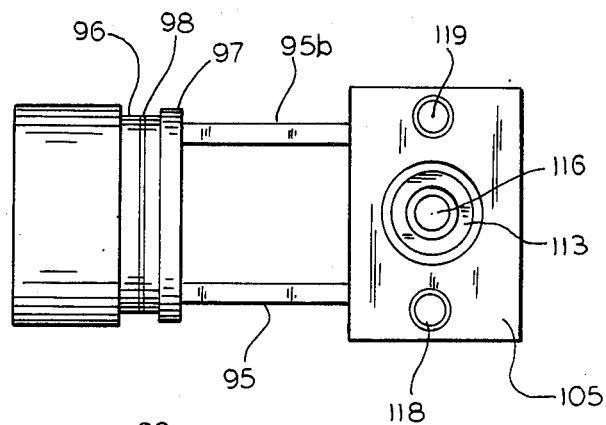
FIG. 4
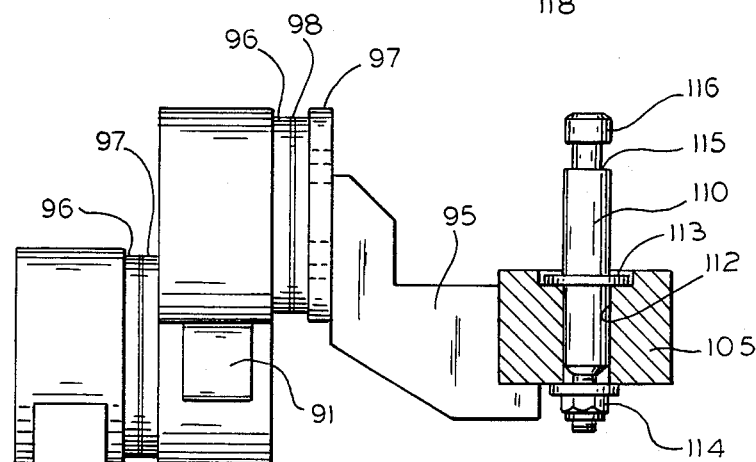
FIG. 3
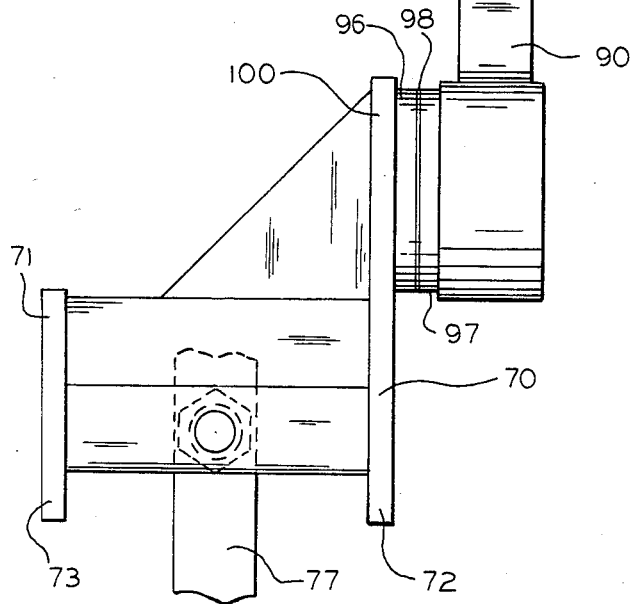
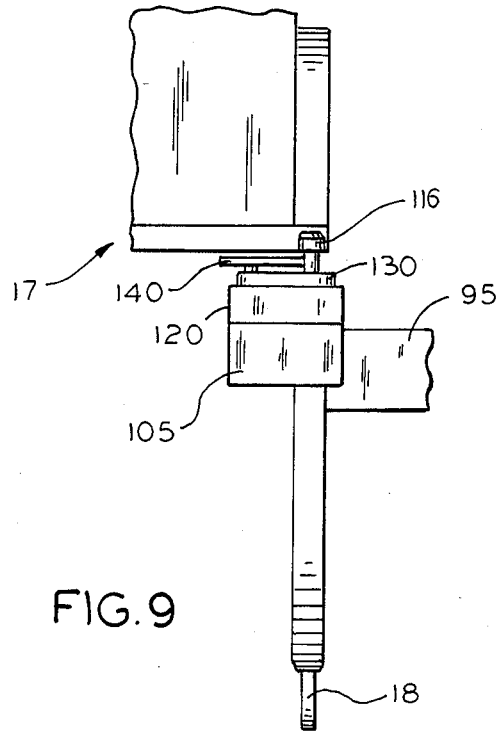
FIG. 9

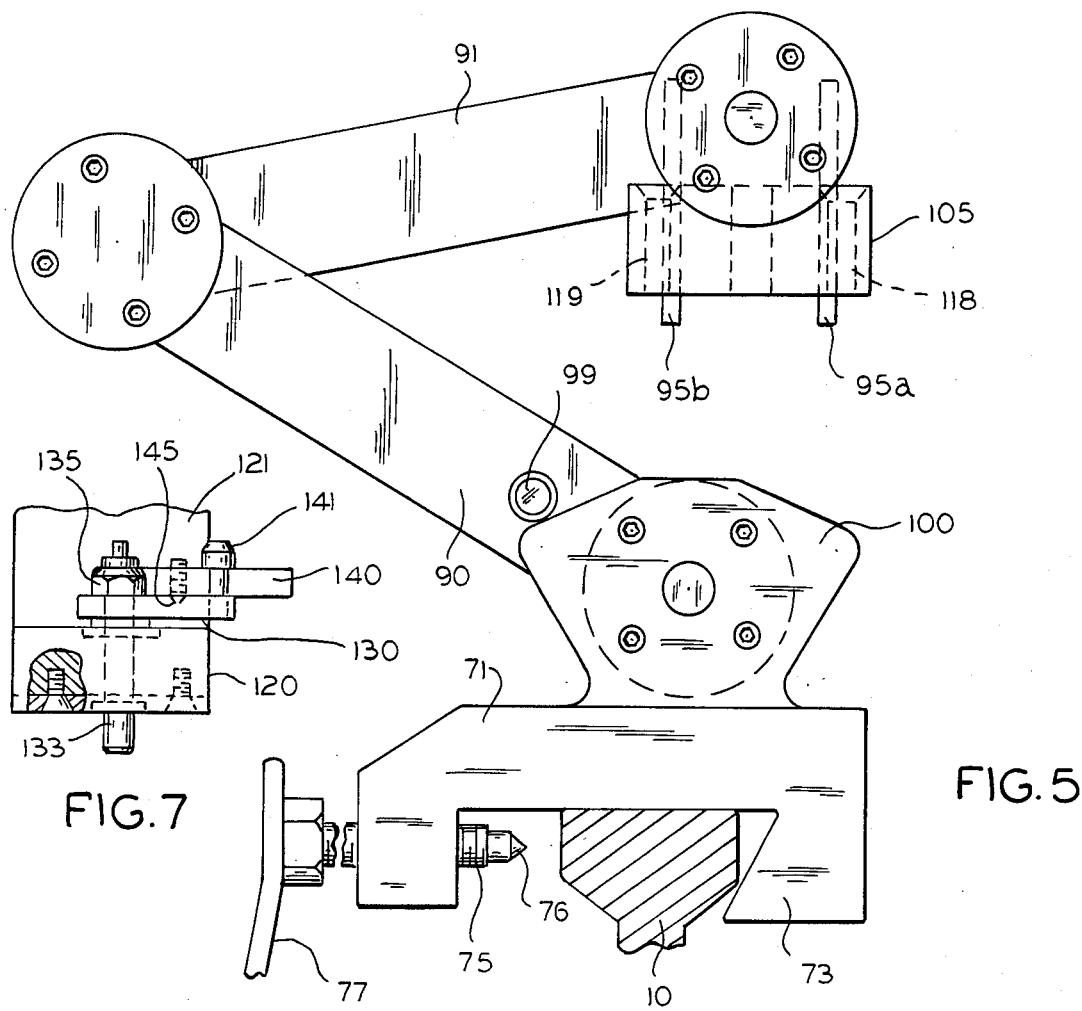
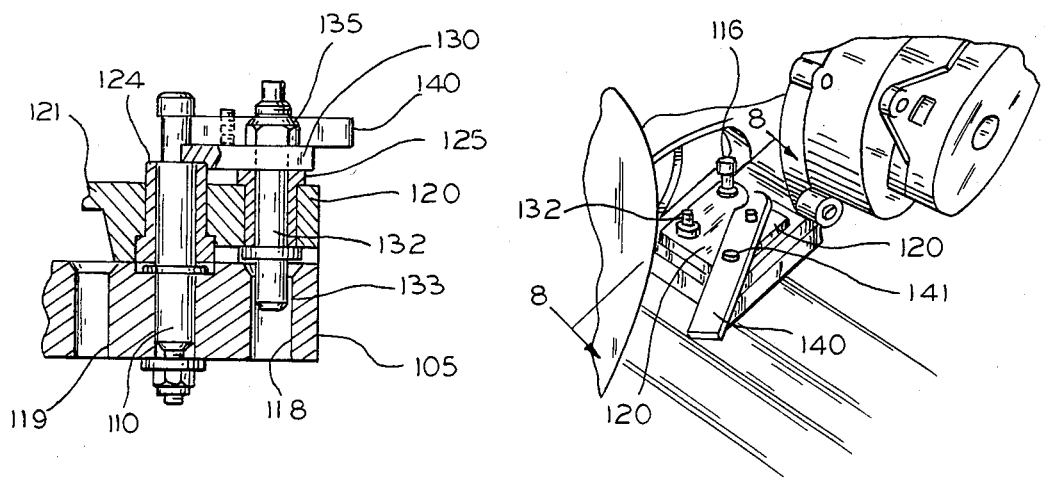

RAIL CUTTING APPARATUS

BACKGROUND OF THE INVENTION

This invention pertains to a rail cutting apparatus and, more particularly, to a portable rail saw operable from both sides of a rail for complete cutting therethrough.

The prior art includes a prior structure of the assignee of this application as shown in U.S. Pat. No. 4,068,415, wherein a linkage structure pivotally connected to a rail-engaging clamp supports a rail saw for making the major cut through a rail from one side of the rail and completing the cut from the other side, with the structure requiring an inversion of the saw. This structure has disadvantages in that the saw has to be inverted and, if driven by a gas engine, could result in leakage of gasoline.

Additional devices are shown in U.S. Pat. Nos. 3,974,596 and 4,033,074 which provide for operation of a rail saw from either side of a rail without inverting the saw. In the first of these patents, it is necessary to remove the rail saw from a laterally-extending member of the mounting structure and reposition it for operation from the second side of the rail. In the second patent, the rail saw can be pivoted relative to its mounting structure for orientation in two different positions for operation at opposite sides of the rail. However, in this patent, there is no structure for positively holding the saw in either orientation and it is necessary to have a saw guide fixed to the rail clamping structure for guiding the saw. This saw guide is subject to wear and, therefore, there is diminishing accuracy of the cut. Additionally, there is a lack of adjustability of the orientation of the saw relative to the rail.

U.S. Pat. No. 4,156,991, owned by the assignee of this application, shows a rail saw operable from either side of a rail, with limit stops for rotational positioning of the rail saw at either side of the rail. There is no positive holding of the rail saw in either of the rotative positions.

SUMMARY OF THE INVENTION

A primary feature of the rail cutting apparatus disclosed herein resides in the mounting of the rail saw on linkage structure enabling operation of the rail saw from both sides of the rail, with locking of the rail saw in either of two orientations by structure associated with the mounting elements.

A primary object of the invention is to provide a new and improved rail cutting apparatus having a pair of links pivotally interconnected forming a linkage structure connected to a rail-engaging clamp and, also, carrying the rail saw, with there being an offset arm on the linkage structure mounting the rail saw in either of two upright positions with the cutting element of the rail saw being in the same vertical plane in both positions to cut a rail from opposite sides thereof, and having means for locking the rail saw in either of the two positions.

Still another object of the invention is to provide rail cutting apparatus as defined in the preceding paragraph wherein the offset arm has a mounting block with a mounting post and a pair of openings located one at each side of the mounting post and all lying in said vertical plane and a mounting plate connected to the rail saw has an opening to receive said mounting post and a projecting pin adjacent said last-mentioned opening to fit into one of the openings in said mounting block. A locking lever on the mounting plate is engageable with the mounting post to prevent removal of the mounting plate from the mounting block. The rail saw can be positioned at either side of the rail by rotation of the mounting plate on the mounting post.

DESCRIPTION OF THE DRAWINGS

FIG. 3 is a rear elevational view of the rail saw mounting structure;

FIG. 4 is a fragmentary plan view of the rail saw mounting structure;

FIG. 5 is a side elevational view of the rail saw mounting structure, viewed from the left in FIG. 3;

FIG. 6 is a fragmentary perspective view showing the coaction between the mounting block and the mounting plate and looking toward the far side of the saw as viewed in FIG. 1;

FIG. 7 is a rear elevation of the mounting plate and associated structure, with parts broken away;

FIG. 8 is a vertical section of the structure shown in FIG. 6 and taken generally along the line 8—8 in FIG. 6; and FIG. 9 is a fragmentary front elevation of the rail cutting apparatus.

DESCRIPTION OF THE PREFERRED EMBODIMENT

Figure 1:
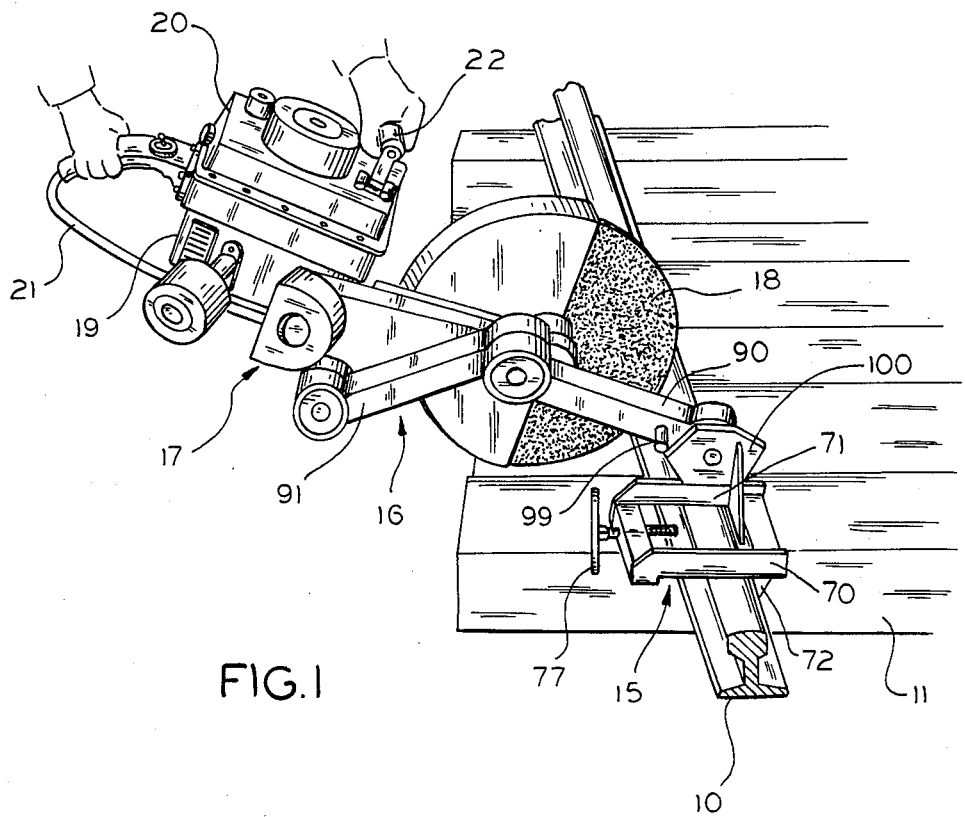
FIG. 1 is a perspective view of the rail cutting apparatus applied to a rail of a railroad right-of-way.
Figure 2:
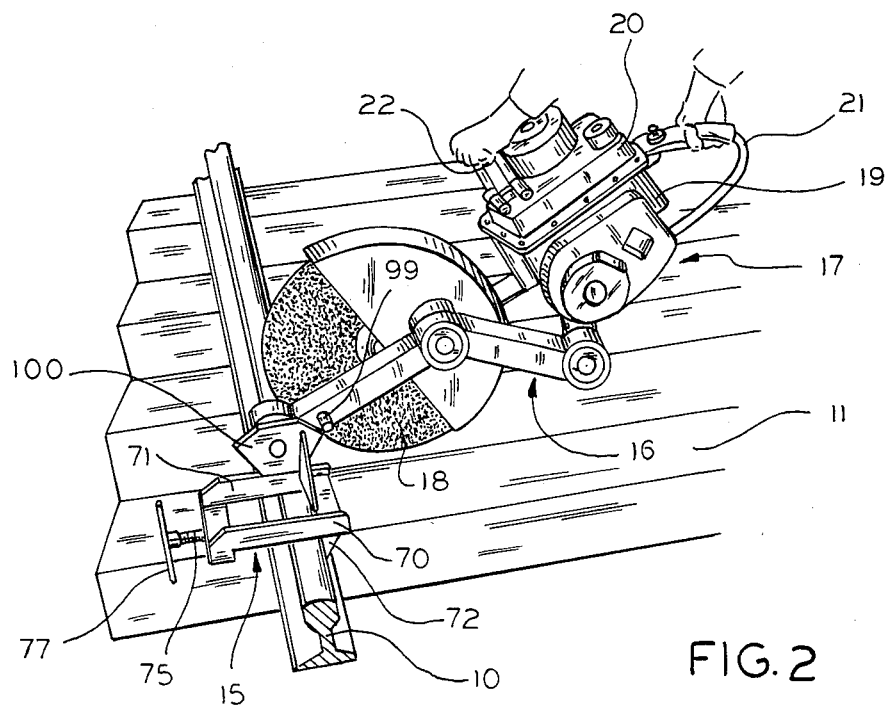
FIG. 2 is a view, similar to FIG. 1 showing the rail saw at the opposite side of the rail.

The rail cutting apparatus is shown generally in FIGS. 1 and 2 in association with a rail 10 supported by spaced-apart ties 11.

The rail cutting apparatus includes a rail clamp, indicated generally at 15, which pivotally mounts a linkage structure, indicated generally at 16, and with the linkage structure mounting a rail saw, indicated generally at 17. The rail saw includes a power-driven abrasive disc 18 driven by suitable means from an engine, such as a gas engine 19, having a fuel tank 20. The saw has handle members 21 and 22 facilitating manual movement thereof.

The general operation of the rail cutting apparatus is best shown in FIGS. 1 and 2. With the rail saw positioned as shown in FIG. 1, an operator may move the abrasive disc 18 down through a major part of the rail 10. In order to complete the cut, the rail saw needs to be positioned at the opposite side of the rail 10, as seen in FIG. 2, wherein the abrasive disc 18 is in the same plane as when at the other side of the rail and may be moved through the rail 10 to complete the cut.

The general structure of the rail clamp 15 and the linkage structure 16 is the same as that shown in William P. McIlrath U.S. Pat. No. 4,156,991. The disclosure of said patent is incorporated herein by reference.

The rail clamp 15 includes a pair of interconnected plates 70 and 71 which rest on top of the rail and which have a pair of depending fingers 72 and 73, respectively, engageable with one side of the head of the rail. A threaded member 75 with a pointed end 76 is mounted in a section of the rail clamp at the opposite side of the rail and has a wing-like handle 77 for rotation thereof to tighten the pointed end and the fingers 72 and 73 against the rail head.

The linkage structure 16 includes a first link 90 and a second link 91 which are pivotally interconnected, with the first link 90 being pivotally connected to the rail clamp 15 and the second link 91 being pivotally connected to an offset arm 95, formed by spaced members 95a and 95b. Each of these three pivot connections is of the same construction as described in the McIlrath U.S. Pat. No. 4,156,991, including a pair of circular plates 96 and 97 associated one with each pivotally interconnected part and with a bearing member, such as a sheet of Teflon 98 disposed therebetween and with the parts held together by a threaded bolt structure and compressed by a spring member, such as a Belleville spring (not shown). This construction of the three pivot connections provides a rigid mounting for the rail saw which minimizes any side sway of the structure. The link 90 has a laterally-extending pin 99 for engagement with a shaped upper surface of a member 100 carried by the rail clamp 15 to limit the downward pivoting of the link 90 when at either side of the rail.

The offset arm 95 has a mounting block 105 at an end thereof. The mounting block 105 has an upwardly-extending post 110, with a part 112 fitted within an opening in the mounting block and held in position by coaction between a flange 113 and a washer and bolt 114, threaded onto an end of the part 112. The post has an annular peripheral groove 115 below a head 116 for coaction with a locking lever to be described. Additionally, the mounting block 105 has a pair of through openings 118 and 119 which are tapered at their upper ends to receive a pin to be described. Each of the openings 118 and 119 lies in a vertical plane which is coincident with the vertical plane containing the abrasive disc 18.

The rail saw carries a mounting plate 120, seen in FIGS. 6-8 and having an arm 121 which can be suitably attached to the frame of the rail saw. The mounting plate 120 has a pair of openings provided with bushings 124 and 125 and which are retained within the openings by a locking lever plate 130 secured in spaced relation to the upper side of the mounting plate 120. The bushing 124 is of a size to slidably fit on the post 110 extending upwardly from the mounting block 105. The bushing 125 receives a downwardly-projecting pin 132 having a lower end 133 which can fit within one or the other of the openings 118 and 119 in the mounting block. The flanged pin 132 is retained in position by a nut 135 threaded onto the upper end thereof, which is threaded against the locking lever plate 130.

The openings having the bushings 124 and 125 are oriented so that, with the pin 132 either in the opening 118 of the mounting block as shown in FIG. 8 or in the opening 119 thereof, the rail saw is caused to be accurately positioned with the abrasive disc 18 transverse to the rail and to be maintained in this position.

A locking lever 140 is pivotally mounted to the locking lever plate 130 at the upper side thereof by a headed screw 141 and can move between a release position, shown in FIG. 6, in a counterclockwise direction to have an end thereof fit within the annular peripheral groove 115 of the post 110 to retain the mounting plate 120 in fixed association with the mounting block 105. The upper surface of the locking lever plate 120 has a pair of spaced detent recesses for coacting with a spring-urged detent 145 extending downwardly from the underside of the locking lever to releasably maintain the locking lever in either the release or lock positions.

In operation, the rail clamp 15 is fixed to the rail in a position to align the abrasive disc 18 with the rail location at which the cut is to be made. The rail saw is then mounted to the linkage structure 16 to be in a position as shown in FIG. 1, with this mounting being achieved by the mounting plate 120 movable with the rail saw being lowered onto the mounting post 110 and with placement of the pin end 133 in the opening 118 of the mounting block. The locking lever 140 is then positioned to coact with the annular groove of the mounting post and an initial cut may be made. The cut can be completed by positioning the saw as shown in FIG. 2. The change is made by moving the locking lever 140 to a release position and then raising the rail saw a sufficient distance to release the pin 132 from the mounting block opening 118. The exposed length of pin 132 is less than the height of the mounting post 110 so the saw can then be turned through 180° on the mounting post to locate the pin 132 in alignment with the mounting block opening 119 and the saw then lowered to place the pin 132 into the opening 119, and the locking lever 140 returned to its lock position. In either of the turned positions of the rail saw, the abrasive disc 18 remains in the vertical plane, coinciding with the vertical plane of the desired cut in the rail since the mounting post, the downwardly projecting pin and the openings in the mounting block and the mounting plate are all in same vertical plane.

We claim:

1. A rail cutting apparatus comprising in combination, a rail clamp and a linkage structure pivotally connected to said rail clamp and a rail saw: a mounting block, an offset arm pivotally mounting said mounting block to said linkage structure, a mounting plate carried by said rail saw, means rotatably mounting said mounting plate on the mounting block, and means for locking the mounting plate to the mounting block in either of two rotative positions each of which have an abrasive disc of the rail saw in the same vertical plane.

2. A rail cutting apparatus as defined in claim 1 wherein said means rotatably mounting the mounting plate on the mounting block also enables relative vertical movement therebetween and comprises an upstanding mounting post on the mounting block and an opening in the mounting plate to receive the mounting post.

3. A rail cutting apparatus as defined in claim 2 wherein the means for locking the mounting plate to the mounting block includes a downwardly projecting pin on the mounting plate and a pin-receiving opening in the mounting block.

4. A rail cutting apparatus as defined in claim 3 wherein said mounting post has an exposed length greater than that of said pin whereby the mounting plate may rotate on said mounting post after elevational withdrawal of the pin from the opening in the mounting block.

5. A rail cutting apparatus as defined in claim 4 wherein there are a pair of said openings in the mounting block positioned at opposite sides of the mounting post whereby said pin can fit into one or the other of said pair of openings.

6. A rail cutting apparatus as defined in claim 5 wherein said mounting post and pair of openings lie along a vertical axis coincident with the plane of the abrasive disc of the rail saw.

7. A rail cutting apparatus as defined in claim 6 including a locking lever for locking the mounting plate and mounting block together against relative vertical movement.

8. A rail cutting apparatus as defined in claim 7 wherein said mounting post has a peripheral groove, and means mounting the locking lever on the mounting plate for movement between a locked position engaged in said groove and a non-engaged release position.

9. A rail cutting apparatus comprising, a rail clamp, a linkage structure pivotally connected to said rail clamp, a mounting block, an offset arm pivotally mounting said mounting block to said linkage structure, a mounting post extending upwardly from said mounting block, means defining a pair of openings in said mounting block one at either side of said mounting post and said openings and mounting post all centered on a common vertical plane, and a rail saw having a mounting plate having an opening to receive said mounting post and a downwardly projecting pin to fit into one of the openings in said mounting block, said mounting plate opening and downwardly projecting pin lying in the plane of an abrasive disc of the rail saw, said mounting post having a length greater than the downwardly projecting pin whereby said rail saw can be raised to free said pin from one of the mounting block openings for turning of the rail saw on said mounting post to align said pin with the other of said mounting block openings.

10. A rail cutting apparatus as defined in claim 9 including a locking lever, means pivoting said locking lever to said mounting plate, and a peripheral groove in said mounting post to receive said locking lever and lock the mounting plate to the mounting block.

* * * * *